United States Patent [19]

Grunzinger, Jr.

[11] Patent Number: 4,530,859

[45] Date of Patent: Jul. 23, 1985

[54] METHOD OF PREPARING A POLYMERIC COATING COMPOSITION FROM A BLOCKED ISOCYANATE-FUNCTIONAL POLYMERIC COMPOUND AND A CROSSLINKING AGENT WHICH IS INSOLUBLE IN APROTIC SOLVENTS

[75] Inventor: Raymond E. Grunzinger, Jr., New Scandia Township, Washington County, Minn.

[73] Assignee: Minnesota Mining and Manufacturing Company, St. Paul, Minn.

[21] Appl. No.: 441,319

[22] Filed: Nov. 15, 1982

Related U.S. Application Data

[63] Continuation-in-part of Ser. No. 333,810, Dec. 23, 1981, abandoned.

[51] Int. Cl.$^3$ .............................................. B05D 3/02
[52] U.S. Cl. .......................... 427/385.5; 427/388.2; 427/389; 427/389.9; 427/391; 427/393; 427/393.5; 427/393.6; 528/45; 528/73
[58] Field of Search ................. 528/45, 73; 427/385.5, 427/388.2, 389, 391, 162, 393, 393.6, 393.5, 389.9; 428/425.8, 425.1, 423.1, 423.4, 425.5, 424.2; 525/296, 329.4

[56] References Cited

U.S. PATENT DOCUMENTS

| | | | |
|---|---|---|---|
| 3,248,371 | 4/1966 | Damusis | 260/77.5 |
| 3,267,078 | 8/1966 | Damusis | 260/77.5 |
| 3,555,113 | 1/1971 | Sattler | 260/841 |
| 3,583,943 | 6/1971 | Weber et al. | 260/75 |
| 3,621,000 | 11/1971 | Schmelzer et al. | 260/77.5 AM |
| 3,694,389 | 9/1972 | Levy | 260/23 TN |
| 3,763,269 | 10/1973 | Formaini | 260/75 UA |
| 3,771,571 | 1/1973 | Farah | 260/858 |
| 3,808,162 | 4/1974 | Allen et al. | 260/18 TN |
| 3,824,217 | 7/1974 | Barker | 260/77.5 R |
| 3,846,378 | 11/1974 | Griswold | 260/77.5 TB |
| 3,857,818 | 12/1974 | Frizelle | 260/77.5 TB |
| 3,926,875 | 12/1975 | Tsugukuni et al. | 260/23 TN |
| 3,933,759 | 1/1976 | Hoeschele | 528/45 |
| 3,993,849 | 11/1976 | Victorius | 428/463 |
| 4,031,040 | 6/1977 | Otter et al. | 260/2.5 AW |
| 4,046,744 | 9/1977 | Jenkins | 260/77.5 AQ |
| 4,101,473 | 7/1978 | Lander | 528/45 X |
| 4,203,889 | 5/1980 | Chang et al. | 260/45.8 NT |
| 4,211,849 | 7/1980 | Kollmeier et al. | 521/164 |
| 4,235,977 | 11/1980 | Frisch et al. | 521/166 |
| 4,238,592 | 12/1980 | Schmitt et al. | 528/45 |
| 4,245,080 | 1/1981 | Frisch et al. | 528/60 |
| 4,273,909 | 6/1981 | Arco | 528/45 |
| 4,280,944 | 7/1981 | Saito et al. | 528/45 X |

OTHER PUBLICATIONS

J. E. Pregler, "Flexible Urethane Resins and Coating Materials Development," Contract No. N00019-70-C-0309, Naval Air Systems Command, Department of the Navy, (Mar. 1971).

J. H. Saunders and K. C. Frisch, "Polyurethanes," Chemistry and Technology, vols. 1 and 2, Interscience Publishers, (1964).

E. N. Doyle, "The Development and Use of Polyurethane Products," pp. 27, 49-51, 68 and 69, 91, and 125-144, (McGraw-Hill 1971).

*Primary Examiner*—S. L. Childs
*Attorney, Agent, or Firm*—Donald M. Sell; James A. Smith; Jennie G. Boeder

[57] ABSTRACT

A method of preparing a storage-stable one-part reactive liquid thermal curing polymeric coating composition from an isocyanate-functional polymeric compound which has a substantial portion of its isocyanate groups masked with an isocyanate masking agent, and a crosslinking agent which is substantially insoluble in aprotic solvents. These liquid compositions are homogeneous even when free of solvents. Preferably the crosslinking agent is a crystalline polyol. The method involves the synthesis of a solubilizing oligomer which is formed by the partial reaction of the crosslinking agent and the unmasked isocyanate-functional polymeric compound. The thermal curing of these compositions results in polymeric coatings which possess superior physical properties. These cured coatings are particularly useful in the manufacture of retroreflective sheeting.

14 Claims, No Drawings

METHOD OF PREPARING A POLYMERIC COATING COMPOSITION FROM A BLOCKED ISOCYANATE-FUNCTIONAL POLYMERIC COMPOUND AND A CROSSLINKING AGENT WHICH IS INSOLUBLE IN APROTIC SOLVENTS

This application is a continuation-in-part of copending application Ser. No. 333,810, filed Dec. 23, 1981 now abandoned.

FIELD OF THE INVENTION

This invention relates to a novel method of synthesizing storage-stable, one-part reactive, thermal curing, liquid homogeneous polymeric coating compositions. This invention particularly relates to the synthesis of such homogeneous liquid coating compositions from an isocyanate functional polymeric compound which has a substantial portion of its isocyanate groups blocked or masked with an isocyanate blocking or masking agent, and a crosslinking agent which is substantially insoluble in aprotic solvents and is preferably a crystalline polyol. This invention further relates to the coating compositions prepared according to this method, and to the cured polymeric coatings which result from the thermal curing of these coating compositions.

BACKGROUND OF THE INVENTION

Polyurethane coating compositions prepared from blocked polyurethane compounds are disclosed in numerous patents including U.S. Pat. Nos. 3,583,943; 3,846,378; 3,248,371; 3,267,078; 3,694,389; 3,711,571; 4,046,744; 3,993,849; 3,857,818; 3,621,000; and 3,926,875. However, all of the polyurethane coating compositions of the prior art suffer from at least one of the following defects: They are moisture unstable and thus have poor shelf stability and short coating lives; they are required to have solvent contents of greater than about 40 percent; they cure to coatings which are unstable at temperatures greater than about 100° C. and/or are inflexible at temperatures below about 0° C.; or they produce cured coatings which are inelastic, have poor tensile strengths, or are lacking in surface hardness. Additionally, another serious problem encountered with many of the cured polyurethane coatings provided by the prior art is that they have poor weatherability and yellow when used in exterior environments.

The coatings prepared according to the method of the present invention, from blocked isocyanate-functional polymeric compounds and insoluble crosslinking agents, preferably, crystalline polyols, have improved physical and chemical properties over the polyurethane coatings of the prior art. Such properties include high temperature stability, high tensile strength, impact resistance, resistance to degradation and abrasion upon exposure to exterior environments, and reduced tendency to yellow in exterior applications.

Crystalline polyols have heretofore not been useful in preparing cured polyurethane films since they are substantially insoluble in aprotic solvents, which are necessary solvent systems for urethane manufacture. For example, tris(2-hydroxyethyl)isocyanurate, a preferred crystalline polyol crosslinking agent, has been used as a crosslinker for urethane foams (U.S. Pat. No. 4,031,040), but has not been used to any extent in urethane films or compositions due to its very limited solubility in aprotic solvents.

While J. E. Pregler in "Flexible Urethane Resins and Coating Materials Development", Contract No. N0019-700-C-0309, Naval Air Systems Command, Department of the Navy (March 1971) disclosed the use of tris(2-hydroxyethyl)isocyanurate as a crosslinker for high performance urethane coatings, the systems disclosed were limited to one-part moisture curing formulations which have the disadvantage of poor shelf stability, short coating lives and limited curing conditions. Additionally, since tris(2-hydroxyethyl)isocyanurate has such limited solubility in common urethane solvents, a complex solvent system had to be devised. Moreover, the insolubility of the tris(2-hydroxyethyl)isocyanurate limited the solids levels of these compositions to less than 60 percent by weight.

The method of the present invention overcomes the problem of the limited solubility of crystalline polyol crosslinkers in aprotic solvents and allows these crosslinkers to be used in the synthesis of coating compositions, including polyurethane coating compositions.

SUMMARY OF THE INVENTION

The present invention provides a method of preparing a storage-stable, one-part reactive, thermal curing liquid polymeric coating composition, which is homogeneous even when free of solvent, from an isocyanate-functional polymeric compound which has a substantial portion of its free isocyanate groups blocked with isocyanate blocking groups, and a crosslinking agent which is substantially insoluble in aprotic solvents; the method comprising the steps of:

(a) providing an isocyanate-functional polymeric compound which has a substantial portion of the isocyanate groups masked by agents that can be removed by heating;

(b) adding a crosslinking agent to the masked isocyanate-functional polymeric compound and allowing the crosslinking agent and the masked isocyanate-functional polymeric compound to react at an elevated temperature for a period of time which is sufficient to unmask no more than about one-third of the masked isocyanate-functional polymer, in order to partially react the crosslinking agent and the unmasked isocyanate-functional polymer so as to form an oligomer in which the unreacted portion of the crosslinking agent and the polymer are soluble; and (c) maintaining the reaction at the elevated temperature until a homogeneous liquid solution results.

The method of the present invention allows coating compositions, such as polyurethane coating compositions, to be synthesized using crosslinking agents such as crystalline polyols, which are substantially insoluble in aprotic solvents. This is due to the fact that the reaction of the partially unmasked isocyanate-functional polymer and the crosslinking agent creates an oligomer comprising the unmasked polymer with partial crosslinker functionality. This oligomer acts as an effective solubilizing agent for the balance of the crosslinking agent. The mixture is allowed to react at the elevated temperature until all of the crosslinking agent is dissolved. The resultant homogeneous liquid solution may be cooled to room temperature and stored, or sold as a storage stable, nonmoisture reactive polymeric coating composition. This coating composition may be thermally cured by further heating to provide a polymer having urethane or urea linkages. The thermally cured films or coatings thus produced possess an unusual balance of desirable physical and chemical properties such as, high tensile strength, low temperature flexibility and high temperature stability, exterior durability, superior elongation properties, solvent resistance, and a reduced tendency to yellow when exposed to exterior environments.

The method of the present invention does not require the presence of solvents. Thus, the coating compositions prepared by this method are capable of comprising up to about 100% solids. This is extremely important in applications where it is desired to keep the level of hydrocarbon emissions at a minimum to meet pollution standards. Additionally, this factor becomes increasingly important as the cost of solvents increases.

The coating compositions prepared by the method of the present invention are nonmoisture reactive and thus, are storage stable for long periods of time, i.e., greater than 3 to 4 years. Additionally, they enable manufacturing costs to be reduced since they don't require a moisture controlled environment in order to cure.

The thermally cured films and coatings prepared from the coating compositions of the present invention can be formulated to have all of the following properties: high impact resistance; low temperature flexibility, i.e., a glass transition temperature ($T_g$) of less than 0° C., and preferably less than 150° C., with high temperature stability, i.e., at temperatures greater than 100° C. and preferably at temperatures greater than 150° C.; tensile strengths greater than 150 kg/cm$^2$, and preferably greater than 200 kg/cm$^2$; superior elongation properties, i.e., greater than 100% elongation and preferably greater than 150% elongation; solvent resistance to even such harsh solvents as tetrahydrofuran and methylene chloride; resistance to degradation and abrasion upon exposure to exterior environments; and optical clarity with a resistance to yellowing upon exposure to exterior environments.

DETAILED DESCRIPTION OF THE INVENTION

The first step in the method of the present invention is the synthesis of an isocyanate-functional polymeric starting compound.

Preparation of the Isocyanate-functional Polymeric Starting Compound

Preferably the isocyanate-functional polymeric starting compound is an isocyanate-terminated polyurethane compound. Commercially available isocyanate-terminated polyurethane compounds include polymers of polyoxytetramethylene glycol and toluene diisocyanate, available as Adiprene ® L-100 from E. I. du Pont De Nemours and Company, Inc., and polymers of polyoxytetramethylene glycol and methylene-bis-(4-cyclohexyl-isocyanate), available as Adiprene ® LW- U from E. I. du Pont De Nemours and Company, Inc. Alternatively, the isocyanate-terminated polyurethane may be prepared by methods well-known in the art. For example, U.S. Pat. Nos. 4,211,804; 3,933,725; and E. N. Doyle in "The Development and Use of Polyurethane Products", McGraw-Hill, Inc. (1971), at pages 93–124, describe procedures for the preparation of isocyanate-terminated polyurethanes.

Generally, the preparation of polyurethanes involves the reaction of a polyol, polyether polyol, hydroxyl-terminated polyester, acrylic polyol, polyester amide, or other polyfunctional active hydrogen compound with a diisocyanate or other polyisocyanate, preferably using an excess of the polyisocyanate. An extensive description of some of the useful techniques for preparing polyurethanes can be found in J. H. Saunders and K. C. Frisch, "Polyurethanes: Chemistry and Technology", Part II, Interscience (New York 1964), especially on pages 8 to 49, and in the various references cited therein.

Polyols useful in preparing the isocyanate-terminated polyurethane compound are diols, triols, and combinations thereof. Such polyols include those disclosed in U.S. Pat. Nos. 3,583,943; 3,846,378; 4,046,744; and 3,248,371. Other useful polyols are taught by E. N. Doyle in "The Development and Use of Polyurethane Products", McGraw-Hill, 1971. Preferred polyols include hydroxy-terminated linear polyols prepared from oxiranes and lactones. These preferred polyols are exemplified by polyoxyethylene diols, polyoxypropylene diols and 2-oxepanone polymers of 2,2′-oxybisethanol known as polycaprolactone diols.

Useful polyisocyanates are those commonly employed in polyurethane synthesis, among these being aliphatic and cycloaliphatic diisocyanates such as hexamethylene diisocyanate, trimethylhexamethylene diisocyanate, isophorone diisocyanate, 4,4′-methylenedicyclohexyl diisocyanate, and the like; aromatic diisocyanates such as toluene diisocyanates and 4,4′-methylenediphenyl diisocyanate; and higher polyisocyanates such as a triisocyanate, for example, the buiret of 1,6-hexamethylene diisocyanate, commercially available as Desmodur ® N from Mobay Chemical Company. Other polyisocyanates which are useful for forming the isocyanate-terminated polymer are disclosed in U.S. Pat. Nos. 3,846,378; 3,621,000; 3,926,875; 3,993,849; 4,046,744; and 3,694,389. Still other useful polyisocyanates are taught by Doyle in "The Development and Use of Polyurethane Products", supra.

It has been found that in order to produce cured polyurethane films which have optimal low-temperature flexibility, exterior durability, and a reduced tendency to yellow, it is preferred to use linear diols and aliphatic diisocyanates to prepare the isocyanate-terminated polyurethane polymer. A particularly preferred linear diol is polycaprolactone having a formula weight of between about 500 and 2,000, preferably between 500 and 1,000. Particularly preferred aliphatic diisocyanates include 4,4′-methylene-dicyclohexyl diisocyanate, cyclohexane-1,4-diisocyanate, hexamethylene-1,6-diisocyanate, isophorone diisocyanate, trimethyl hexamethylene diisocyanate, methyl cyclohexyl diisocyanate, and tetramethylene-1,4-diisocyanate. The most preferred aliphatic diisocyanate is 4,4′-methylenedicyclohexyl diisocyanate, due to its ability to provide cured polyurethane films which have optimal exterior durability and tensile strength. 4,4′-Methylene-dicyclohexyl diisocyanate is also most preferred due to its commercial availability, its low volatility, and the fact that each of its isocyanate groups are equally reactive.

The equivalent ratio of polyisocyanate to polyol may vary between a slight excess of polyisocyanate to a large excess of polyisocyanate, i.e. from an equivalent ratio of about 1.01:1.00 NCO/OH, to an equivalent ratio of about 4.00:1.00 NCO/OH. Preferably the equivalent ratio of NCO/OH is 2:1.

Additionally, it is preferred that a typical urethane synthesis catalyst be used to prepare the isocyanate-terminated polyurethane polymer. Exemplary catalysts are disclosed by Doyle in "The Development and Use of Polyurethane Products", supra. Preferred catalysts are those which do not promote trimerization of the diisocyanate such as tin, zinc, manganese, cobalt and zirconium compounds. Tertiary amines may also be used if they meet the nontrimerization requirement. Metal catalysts of tin and zinc are particularly preferred, with a combination of zinc 2-ethylhexoate and dibutyl tin dilaurate being most preferred.

It is preferred that the urethane synthesis catalyst be present in a range from about 0.01% to 2.0% by weight based on the solids content of the formulations, with the concentration of 0.05% by weight being more preferred. For optimum physical strength of the cured polyurethane films it is most preferred to use a catalyst which is a combination of 0.05% by weight tin and 0.15% by weight zinc.

If desired, a solvent which is inert to the reaction, such as benzene, toluene, xylene or similar unreactive hydrocarbons may be present in the reaction mixture in a concentration of up to about 50 parts by weight of solids. The inclusion of a nonreactive solvent is, of course, not desired where a composition having 100% solids is to be prepared. If a solvent is used it should be sufficiently low boiling so that it will vaporize when coated onto a surface in a thin film. Preferred solvents include 2-ethoxyethyl acetate, 2-(2-ethoxy)ethoxyethyl acetate, 2-butoxyethyl acetate, toluene, xylene, ethyl acetate, butyl acetate, amyl acetate, other similar esters, ketones, chlorinated solvents, nitroaliphatic solvents, dioxane, and the like.

In addition, to isocyanate-terminated polyurethane compounds, other isocyanate-functional polymers, such as isocyanate-functional acrylics, may be utilized as the polymeric starting compound. The preparation of isocyanate-functional acrylics is well-known in the art, and is described in U.S. Pat. Nos. 4,301,257; 4,291,632; 3,929,744; and in the *Journal of Applied Polymer Science*, Vol. 20, paged 3305–3311 (1976), all of which are incorporated herein by reference. Furthermore, polymers which can, by known reaction techniques, be converted to isocyanate-functional polymers are also usefully employed as the polymeric starting compound. For example, amine-functional polymers can be converted into isocyanate-functional polymers by the methods described in *The Encyclopedia of Chemical Technology*, John Wiley and Sons, New York, N.Y. (1981), Vol. 13, at pages 799–807, incorporated herein by reference.

Masking or Blocking Agents

A substantial portion of the isocyanate-functionalities of the polymeric starting compound are either blocked, masked or joined to groups or moieties that can be removed by heating. By "a substantial portion" it is meant that more than about 70 percent of the isocyanate groups are masked or blocked, preferably more than 99 percent, and most preferably more than 99.9 percent.

Isocyanate blocking agents are well known in the art. For instance, there can be used known blocking agents of the phenol type, lactam type, active methylene type, alcohol type, mercaptan type, acid amide type, imide type, amine type, imidazole type, urea type, carbonate type, imine type, oxime type and sulfite type. Blocking agents of the phenol type, oxime type, lactam type and active methylene type are used especially advantageously.

Specific examples of blocking agents which may be utilized in the practice of this invention are as follows:
(a) Phenol type blocking agents Phenol, cresol, xylenol, nitrophenol, chlorophenol, ethylphenol, t-butylphenol, hydroxybenzoic acid, hydroxybenzoic acid esters, 2,5-di-tert-butyl-4-hydroxytoluene, etc.
(b) Lactam type blocking agents
ε-Caprolactam, δ-valerolactam, γ-butyrolactam, β-propiolactam, etc.
(c) Active methylene type blocking agents
Diethyl malonate, dimethyl malonate, ethyl acetoacetate, methyl acetoacetate, acetylacetone, t-butylacetoacetate, etc.
(d) Alcohol type blocking agents
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, ω-hydroperfluoro-alcohol, acetocyanohydrin, etc.
(e) Mercaptan type blocking agents
Butylmercaptan, hexylmercaptan, t-butylmercaptan, t-dodecylmercaptan, 2-mercaptobenzothiazole, thiophenol, methylthiophenol, ethylthiophenol, etc.
(f) Acid amide type blocking groups
Acetoanilide, acetoanisidide, acetotoluide, acrylamide, methacrylamide, acetamide, stearylamide, benzamide, etc.
(g) Imide type blocking agents
Succinimide, phthalimide, maleimide, etc.
(h) Amine type blocking agents
Diphenyl amine, phenylnaphthyl amine, xylidine, N-phenylxylidine, carbazole, aniline, naphthyl amine, butyl amine, dibutyl amine, butylphenyl amine, etc.
(i) Imidazole type blocking agents
Imidazole, 2-ethylimidazole, etc.
(j) Urea type blocking agents
Urea, thiourea, ethylene urea, ethylene thiourea, 1,3-diphenylurea, etc.
(k) Carbamate type blocking agents
Phenyl N-phenylcarbamate, 2-oxazolidone, etc.
(l) Imine type blocking agents
Ethyleneimine, etc.
(m) Oxime type blocking agents
Formaldoxime, acetaldoxime, acetoxime, methylethylketoxime, diactyl monoxime, benzophenone oxime, cyclohexanone oxime, etc.
(n) Sulfite type blocking agents
Sodium bisulfite, potassium bisulfite, etc.
Additional isocyanate blocking agents are taught by Doyle in "The Development and Use of Polyurethane Products", supra.

The choice of which blocking agent to use is largely dependent upon the intended use of the resultant coating composition. For example, volatile blocking agents, i.e., blocking agents which volatilize at temperatures between about 90° and 260° C. are preferred when preparing tough films and coatings for exterior applications. Volatile blocking agents will result in a cured coating having maximum crosslink density since the volatile blocking agent will volatilize and will not be available for competition with the crosslinking agent for available isocyanate groups. However, nonvolatile blocking agents, i.e., blocking agents which volatilize at a temperature which is higher than about 260° C. are advantageous when the blocking isocyanate-functional polymer is to be cured between two air impervious layers. Volatile blocking groups would cause blisters or voids to form in the cured composition.

Preferred blocking agents for making tough, durable polymeric coatings and films are oximes or active methylene type blocking agents. The most preferred blocking agents are 2-butanoxime, also commonly known as methyl ethyl ketoxime, ethyl acetoacetate, and t-butylacetoacetate.

The equivalent ratio of blocking agent to isocyanate equivalent present in the isocyanate-functional polymer is preferably between about 0.7 to 1.5, and most preferably between 1.0 to 1.1. If the blocking agent is not present in a concentration of more than about 0.7 equivalents blocking agent to isocyanate equivalent gellation will prematurely occur upon mixing the polymer with the crosslinker.

Generally the blocked isocyanate-functional polymer is prepared by mixing the blocking group and the isocyanate-functional polymer as is described by Saunders and Frisch in "Polyurethanes: Chemistry and Technology ", supra, or by Doyle in "The Development and Use of Polyurethane Products", supra, incorporated herein by reference. Additional references which describe the manufacture of blocked isocyanate polymers include U.S. Pat. Nos. 4,242,248; 4,280,944; and 3,830,785, all of which are incorporated herein by reference. If desired, a solvent which is inert to the reaction, such as benzene, toluene, xylene or similar unreactive hydrocarbons may be utilized. However, the use of a solvent is not required and is, of course, not desired where a composition containing 100% solids is to be prepared. Again, if a solvent is used it is preferred that it be sufficiently low boiling that it will vaporize when coated onto a surface in a thin film. Alternatively, commercially available blocked isocyanate polymers such as Adiprene ® B-16, available from E. I. du Pont De Nemours and Co., may be employed.

As an alternative to employing well-known blocking agents to block the isocyanate functionality of the polymer, polymeric materials may be utilized which inherently contain masked isocyanate functionalities, which can be unmasked by heating. For example, cyclic nitrile adducts containing two or more cyclic nitrile-functional groups enter into a ring-opening addition reaction in the presence of heat and crosslinking agents to result in cured polymers containing urethane and/or urea linkages. The preparation of cyclic nitrile adducts is described in U.S. Pat. Nos. 3,531,425; 3;652,507; 3,702,320 and 4,049,007, all of which are incorporated herein by reference.

Crosslinking Agents

The second step in the process of the present invention is the addition of a crosslinking agent, which is substantially insoluble in aprotic solvents, to the blocked or masked isocyanate-functional polymer. By "substantially insoluble" it is meant that the crosslinking agent is less than 5 percent, preferably less than 1 percent, and most preferably less than 0.1 percent by weight soluble in aprotic solvents. The crosslinking agent and masked or blocked isocyanate-functional polymer are allowed to react at an elevated temperature which is sufficient to unmask or unblock no more than about one-third of the isocyanate functionalities.

The elevated temperature at which the reaction is allowed to occur is preferably about the minimum dissociation temperature for the particular isocyanate blocking or masking agent. The minimum dissociation temperature is the temperature at which greater than about 0.1 percent of the isocyanate groups of the polymeric compound are unblocked or unmasked. This temperature for any particular isocyanate masking or blocking agent can be found by determining the temperature at which an isocyanate group absorbtion appears in the infrared spectrum of an isocyanate-functional polymer which has substantially all, i.e., more than about 99.9%, of its free isocyanate groups blocked or masked by the particular blocking or masking group. Generally the minimum dissociation temperature will be between about 90° and 260° C. While temperatures higher than the minimum dissociation temperature may be used, at higher temperatures the reaction is more difficult to control and may result in premature gellation of the polymer.

The reaction may take place in the presence or absence of an inert organic solvent. However, where a coating composition having 100% solids is desired, no solvents are present. After the reaction mixture becomes homogeneous, the reaction is allowed to continue at the elevated temperature for a period of time sufficient to insure that a quantity of the solubilizing oligomer is formed which is sufficient to dissolve the remainder of the unreacted crosslinking agent. Usually heating for about 20 to 90 minutes, depending on the temperature, is sufficient to insure that enough of the solubilizing oligomer is formed. The homogeneous solution is then cooled to room temperature and may be stored or sold as a stable polymeric coating composition. If an insufficient quantity of solubilizing oligomer has been formed, the crosslinking agent will precipitate upon cooling to form a heterogenous mixture. This problem can be corrected by heating the mixture as indicated above until a sufficient quantity of solubilizing oligomer has been formed.

Preferred crosslinking agents are crystalline polyols having three or more active hydrogen groups. The crystalline polyol crosslinking agent may possess amine, carboxylic, or mercapto functionalities or any combination thereof, such that the total number of active hydrogen groups per molecule is greater than or equal to 3. The crosslinking agent may be a liquid or solid. While the method of the present invention relates particularly to the use of crosslinking agents which are insoluble in aprotic solvents, it is also useful with crosslinking agents which are soluble in aprotic solvents.

Particularly preferred insoluble crosslinking agents are low molecular weight, i.e., less than about 500, crystalline polyols because they provide cured coatings having the most desirable physical properties. In particular, cured coatings crosslinked by tris(2-hydroxyethyl)-isocyanurate, pentaerythritol, trimethylol propane and trimethylol ethane are more resistant to yellowing when exposed to external environments, are more durable, and are more extensible than any of the crosslinked polymeric urethane or urea coatings known to the prior art.

Other useful low molecular weight crystalline polyols include isocyanurates such as tris(hydroxy methyl)isocyanurate, tris(2-hydroxy-3-chloropropyl)-isocyanurate, and tris(2-hydroxy propyl)isocyanurate. Additionally useful low molecular weight polyols are triols produced by the substitution of lower alkyl ($C_1$–$C_8$) groups on the second carbon atom of glycerol. Such triols include trimethylolethane, etc.

While they are not particularly preferred, higher molecular weight, i.e., above 500, crystalline polyols are useful crosslinking agents. Useful higher molecular weight crosslinking agents are triols produced through the addition condensation of lactones and oxiranes to glycerol or isocyanurate triols. Included among these triols are polycaprolactone polyols, and polyoxyethylene or polyoxypropylene derivatives of hydroxyalkyl isocyanurates.

The equivalent ratio of isocyanate group (both blocked and unblocked) to active hydrogen of the crosslinking agent is preferably within the range of about 0.8:1.0 to 2.0:1.0, and is most preferably about 1.0:1.0. All of the crosslinking agent may be added to the blocked isocyanate-functional polymer at the time of preparing the homogeneous coating composition. Optionally, only a portion, for example, 2 to 10%, need be added at this stage, with the remainder being added to the coating composition at the time of curing.

To obtain a cured polymeric coating the homogeneous coating composition is subjected to a standard cure by heating to a temperature which is at least equal to the minimum dissociation temperature for the particular blocking group used. This temperature will normally be between about 100° and 160° C. The time required for curing is dependent upon the curing temperature and is normally between about 10 minutes and 16 hours.

It is preferred when preparing a polyurethane coating that a typical urethane catalyst be added to the coating composition before curing. The preferred catalyst is a combination of 0.13 percent by weight dibutyl tin laurate and 0.17 percent by weight zinc-2-ethylhexoate.

The heat curable compositions of this invention are extremely useful in all types of applications where the article may be baked after application of the coating. A few of the most important uses for this type of coating include coatings for metals, paper, textiles, leather, wood, ceramics, brick, plastic, rubber, stone and concrete surfaces. While it is preferred to use the coating compositions in a 100 percent solids form, the viscosity of such high solids coatings may be too high for some coating processes. The viscosity of the coating composition may be adjusted by addition of an inert or relatively volatile protic solvent to achieve the appropriate viscosity range for the particular coating process. Such solvents include lower alcohols such as butanol, 2-methoxy ethanol, 2-ethoxy ethanol, and 2-butoxy ethanol. For most coating operations the solvent content need not be greater than about 50 percent by weight and is preferably between about 10 and 40 percent by weight.

The heat curable coating compositions made according to the method of the present invention are extremely useful in the manufacture of retroreflective sheeting, in particular, embedded-lens retroreflective sheeting. Methods of making embedded lens retroreflective sheeting are well known in the art, and are taught by U.S. Pat. No. 2,407,680 to Palmquist et al. As discussed hereinabove, cured polymer coatings made according to the method of the present invention, particularly those crosslinked with low molecular weight crystalline polyols, possess superior physical properties including impact resistant, low temperature flexibility and high temperature stability, superior elongation properties, external durability, and resistance to yellowing. Exterior durability and resistance to yellowing upon exposure to exterior environments are essential to the performance of retroreflective sheeting, particularly when used in exterior applications. Additionally, the polymers of the present invention are most advantageously used as the bead bond layer of retroreflective sheeting.

The invention is further illustrated but is not intended to be limited by the following examples in which all parts and percentages are by weight unless otherwise specified.

EXAMPLE 1

Preparation of a storage-stable, heat-curable polyurethane coating composition

The isocyanate 4,4'-methylenedicyclohexyl diisocyanate (150 grams, 1.14 equivalents) was combined with 86.0 grams of 2(2-ethoxy)ethoxyethyl acetate and 0.35 grams of dibutyl tin dilaurate in a reaction vessel. Polycaprolactone, formula weight 530, commercially available as Niax ® polyol PCP-0200 from Union Carbide (160.0 grams, 0.605 equivalents) was dissolved in 86.0 grams of 2-ethoxy ethyl acetate. The polyol solution was then added to the isocyanate solution under a nitrogen atmosphere with rapid agitation while maintaining the reaction temperature at from about 40° to 45° C. This temperature was maintained until a free isocyanate content (NCO) of 3.5% was achieved. Methylethyl ketoxime (43.2 grams, 0.496 equivalents) was then added to the reaction mixture while maintaining the temperature at from 40° to 45° C. until the isocyanate (NCO) absorption in the infrared spectrum disappeared. Tris(2-hydroxyethyl)isocyanurate (42.3 grams, 0.485 equivalents) was then added to the reaction mixture as a solid powder. The temperature was increased to 115° C. and held at this temperature for 30 minutes. A homogeneous liquid polyurethane coating composition resulted which had a viscosity of 9,400 centipoise, a solids content of 66.4% by weight, and a free isocyanate content of less than 0.1%.

EXAMPLE 2

Preparation of a solventless, heat-stable, heat-curable polyurethane coating composition The materials and quantities used in Example 1 with the exception of solvents, were used to prepare a solventless coating composition by the following method. The 4,4'-methylenedicyclohexyl diisocyanate and the tin catalyst were charged to the reaction flask and the molten polycaprolactone was added at a rate so that the reaction mixture was maintained at 65°-75° C. Methylethyl ketoxime was added at a rate which allowed the reaction mixture to reach 90° C. When the isocyanate absorption in the infrared spectrum disappeared, tris(2-hydroxyethyl)isocyanurate was added as a dry powder in a single charge. The reaction temperature was raised to 115°-120° C. and held at this temperature for 20 minutes to achieve a homogeneous liquid solution. The resulting solventless liquid coating composition had a viscosity of 1500 cps at 115° C. The solventless solution was a very viscous semi-solid at 20° C., but was flowable and processable at 65° C.

EXAMPLE 3

Preparation of a heat-curable polyurethane coating composition from a partially blocked polyurethane and a crosslinking agent The isocyanate terminated polyurethane compound was prepared as in Example 1. Methylethyl ketoxime (29.0 grams, 0.334 equivalents) was added as in Example 1 while maintaining the temperature at 40°–45° C. for 2 hours. Solid tris(2-hydroxyethyl)isocyanurate was then added and the temperature of the mixture was increased to 80° C. until a homogeneous liquid solution was obtained. When the infrared spectrum showed no isocyanate peak the reaction mixture was cooled to room temperature. This solution required that 31.6 grams (0.323 equivalents) of tris(2-hydroxyethyl)-isocyanurate be dissolved in it by heating to 100° C. in order to achieve a heat-curable liquid coating composition.

EXAMPLE 4

Evaluation of crosslinking agents

Blocked polyurethane compounds were prepared as in Example 1. Crosslinking agents were later added and the mixture was heated to 115° C. to achieve a homogeneous liquid polyurethane coating composition. The crosslinkers were evaluated as shown in Table 1, by coating the heat-curable solutions onto an alkyd coated release paper to form 0.05 millimeter dry films, and curing for ten minutes at 150° C.

TABLE I

| Crosslinker | Appearance | Elongation | Tensile Strength |
|---|---|---|---|
| Tris(2-hydroxyethyl)isocyanurate | Colorless, tack free | 260% | 400 kg/cm$^2$ |
| Trimethylol propane | Colorless, tack free | 330% | 250 kg/cm$^2$ |
| Pentaerythritol | Colorless, tack free | 185% | 435 kg/cm$^2$ |
| Synres ® 4004 Alkyd[1] | Straw, tack free | 153% | 400 kg/cm$^2$ |
| Butvar ® B76[2] | Colorless, tack free | <50% | 1100 kg/cm$^2$ |
| Acryloid ® A 608[3] | Colorless, tack free | <30% | 650 kg/cm$^2$ |

[1]An oil-free synthetic polyester resin with a hydroxyl no. of 77 and an acid value of 15, commercially available from Synres Corp.
[2]A polyvinylbutyral resin with a hydroxyl no. of 160, commercially available from Monsanto Corp.
[3]A hydroxy functional acrylic resin with a hydroxy equivalent weight of 600 on a solids basis, commercially available from Rohm and Haas Company

EXAMPLE 5

Effect of polycaprolactone diol molecular weight on low temperature flexibility of cured polyurethane coatings Polyurethane coating compositions were prepared as in Example 1 using the polycaprolactone diols of Table II. Table II lists the polycaprolactone diol, its formula weight, and the molecular weight and viscosity of the resultant liquid polyurethane coating composition. The coating compositions were then coated and heat cured as in Example 4. Table II lists the glass transition temperature ($T_g$) for the cured film.

TABLE II

| Polycaprolactone Diol | Formula Weight of Polycaprolactone Diol | Molecular Weight of Coating Composition | Viscosity (cps) of Coating Composition | $T_g$ of Cured Film |
|---|---|---|---|---|
| Niax ® polyol PCP-0200[1] | 530 | 6,600 | 9,400 | 0° C. |
| Niax ® polyol PCP-0210[1] | 830 | 7,800 | 17,300 | <−133° C. |
| Niax ® polyol PCP-0230[1] | 1250 | 10,000 | 26,100 | —[2] |

[1]These polycaprolactone diols are polymers of 2-oxepanone and 2,2'-oxy-bis(ethanol), commercially available from Union Carbide.
[2]The urethane produced crystallized upon storage.

EXAMPLE 6

Ethyl acetoacetate as a blocking group

An isocyanate terminated polyurethane was prepared according to the procedure of Example 1. Zinc 2,4-pentanedionate (0.061 gm) was then added to the polyurethane followed by the dropwise addition of ethyl acetoacetate (64.5 gms, 0.496 equivalents). The reaction mixture was maintained at between 90°–95° C. for 2 hours, and then allowed to cool to room temperature under a nitrogen atmosphere. An infrared spectrum of the reaction mixture evidenced a small percentage of isocyanate groups which were not blocked.

The reaction mixture was then heated to 65° C. and tris(2-hydroxyethyl)isocyanurate (42.3 gms., 0.485 equivalents) was added as a dry powder. An exothermic reaction occurred, reaching a temperature of 79° C. The temperature of the reaction mixture was raised to 90° C. for 1 hour to obtain a homogeneous liquid solution. Upon cooling a liquid polyurethane coating composition was obtained which had a viscosity of 35,000 cps and a solids content of 80.8 percent by weight. When coated as a film and thermally cured at 150° C. for 10 minutes a cured polyurethane film was formed which had an elongation value of 310%, and a tensile strength value of 185 kg/cm$^2$.

What is claimed is:

1. A method of preparing a storage-stable non-moisture reactive liquid coating composition which is homogeneous even when free of solvent and which may be thermally cured to form a polymeric film having urethane or urea linkages, comprising the steps of:
   (a) providing an isocyanate-functional polymeric compound which has more than about 70 percent of the isocyanate groups masked by agents that can be removed by heating;
   (b) adding a crosslinking agent, which is insoluble in aprotic solvents, to said masked isocyanate-functional polymeric compound, and allowing said crosslinking agent and said masked isocyanate-functional polymeric compound to react at an elevated temperature for a period of time which is sufficient to unmask no more than about one-third of said masked isocyanate-functional polymeric compound, in order to partially react said crosslinking agent and said unmasked isocyanate-functional polymer so as to form an oligomer in which the unreacted portions of said crosslinking agent and said masked isocyanate-functional polymer are soluble; and
   (c) maintaining said reaction at said elevated temperature until a homogeneous liquid solution results wherein said method can be performed in the absence of any solvent.

2. The method of claim 1 wherein said method additionally comprises the step of:

(d) stopping said reaction once said homogeneous liquid solution results by cooling said homogeneous liquid solution to a temperature which is below the minimum dissociation temperature for said masking agent.

3. The method of claim 1 wherein said isocyanate-functional polymeric compound is an isocyanate-terminated polyurethane compound.

4. The method of claim 1 wherein said isocyanate-functional polymeric compound is an isocyanate-functional acrylic.

5. The method of claim 1 wherein at least a portion of said masking agents is the oxime type blocking agent 2-butanoxime.

6. The method of claim 5 wherein said blocking agent is present in a concentration of at least 0.7 equivalents of blocking agent per isocyanate equivalent present in said isocyanate-functional polymeric compound.

7. The method of claim 1 wherein said isocyanate-functional polymer and said masking agent are incorporated in a cyclic nitrile adduct comprising two or more nitrile functional groups.

8. The method of claim 1 wherein said crosslinking agent is selected from the group consisting of crystalline polyols having three or more active hydrogen groups.

9. The method of claim 8 wherein said crosslinking agent is a crystalline polyol having a molecular weight of less than about 500.

10. The method of claim 9 wherein said crosslinking agent is selected from the group consisting of tris(2-hydroxyethyl)isocyanurate, pentaerythritol, trimethylol propane and trimethylol ethane.

11. The method of claim 8 wherein said crosslinking agent is present in a concentration of 0.8 to 2.0 active hydrogen groups per equivalent of isocyanate group, masked or unmasked, of said isocyanate-functional polymeric compound.

12. A storage-stable, nonmoisture reactive liquid coating composition which is homogeneous even when solvent free and which can be thermally cured to form a polymeric film having urethane or urea linkages, said coating composition comprising:
(a) an isocyanate-functional polymeric compound which has more than about 70 percent of its iscoyanate groups masked by agents that can be removed by heating;
(b) a crosslinking agent which is insoluble in aprotic solvents; and
(c) an oligomer in which said crosslinking agent and said masked isocyanate-functional polymeric compound are soluble, said oligomer formed by the partial reaction of said crosslinking agent and said isocyanate-functional polymeric compound.

13. A method of preparing a thermally cured polymeric layer wherein the cured polymer contains urethane or urea linkages, comprising the steps of:
(a) providing an isocyanate-functional polymeric compound which has more than about 70 percent of the isocyanate groups masked by agents that can be removed by heating;
(b) adding a crosslinking agent, which is substantially insoluble in aprotic solvents to said masked isocyanate-functional polymeric compound, and allowing said crosslinking agent and said masked isocyanate-functional polymeric compound to react at an elevated temperature for a period of time which is sufficient to unmask no more than about one-third of said mask isocyanate-functional polymer, in order to partially react said crosslinking agent and said unmasked isocyanate-functional polymer so as to form an oligomer in which the unreacted portions of said crosslinking agent and said masked isocyanate-functional polymer are soluble;
(c) maintaining said reaction at said elevated temperature until a homogeneous liquid solution results;
(d) coating said homogeneous liquid solution on a substrate so as to form a layer; and
(e) heating said layer to a temperature which is at least equal to the minimum dissociation temperature for said masking agent, for a period of time sufficient to cure said thermally cured polymeric layer.

14. A thermally cured polymeric layer containing urethane or urea linkages, prepared according to the method of claim 13 and comprising an isocyanate-functional polymeric compound crosslinked with a crosslinking agent which is insoluble in aprotic solvent wherein the equivalent ratio of isocyanate group present in said isocyanate-functional polymeric compound to active hydrogens present in said crosslinking agent is within the range of about 0.8:1.0 to 2.0:1.0.

* * * * *

UNITED STATES PATENT AND TRADEMARK OFFICE
CERTIFICATE OF CORRECTION

PATENT NO. : 4,530,859

DATED : July 23, 1985

INVENTOR(S) : Raymond E. Grunzinger, Jr.

It is certified that error appears in the above-identified patent and that said Letters Patent is hereby corrected as shown below:

Cover Page, [56], "3,771,571" should read -- 3,711,571 --.

Column 3, lines 55-56, "LW-U" should read -- LW-520 --.

Column 7, line 40, "Adiprene® B-16" should read -- Adiprene® BL-16 --.

Column 13, lines 44-45, "iscoyanate" should read -- isocyanate --.

Signed and Sealed this

Fifteenth Day of October 1985

[SEAL]

Attest:

DONALD J. QUIGG

Attesting Officer

Commissioner of Patents and
Trademarks—Designate